United States Patent [19]

Naito

[11] Patent Number: 4,626,956

[45] Date of Patent: Dec. 2, 1986

[54] ELECTROMAGNETIC FEEDER DRIVE CONTROL APPARATUS

[75] Inventor: Kazufumi Naito, Ohtsu, Japan

[73] Assignee: Kabushiki Kaisha Ishida Koki Seisakusho, Kyoto, Japan

[21] Appl. No.: 649,316

[22] Filed: Sep. 11, 1984

[30] Foreign Application Priority Data

Sep. 12, 1983 [JP] Japan .................................. 58-168058

[51] Int. Cl.[4] ............................................ H01H 47/32
[52] U.S. Cl. ...................................... 361/152; 361/205
[58] Field of Search ................................ 361/152, 205

[56] References Cited

U.S. PATENT DOCUMENTS 3,799,280 3/1974 Aarts .

OTHER PUBLICATIONS

E.D.N. Electrical Design News, "Counter Scheme Provides AC-Mains Control", by Patil, vol. 27, No. 13, Jun. 1982, p. 193.
Micro-Shop Bodensee, Markdorf, "Microprocessor Interface Techniken", by Austin Lesea et al., 1979 p. 111.
Aufbereitungs-Technik, "Moderne Steuer- und Regeltechnik fur Fordergerate mit Magnetantrieb", by H. W. Hockel, No. 8, 1976, pp. 381-385.
EDN Magazine, "Three ICs Control Triacs Digitally", by J. R. Bryttan, No. 13, Jun. 24, 1981, pp. 192-193.
Electronic Components & Applications, "Microprocessor-Based Phase Controller-The 'Look-Back' System", by Gilliam, vol. 4, No. 4, Aug. 1982, pp. 207-214.

Primary Examiner—Michael L. Gellner
Attorney, Agent, or Firm—Staas & Halsey

[57] ABSTRACT

An electromagnetic feeder drive control apparatus includes a drive control circuit composed of a microcomputer for producing a timing signal to control the on/off timing of a switching element on the basis of a signal produced by a sensor upon sensing that the power supply voltage has crossed a value of zero. A photocoupler is interposed between the sensor and the drive control circuit, and between the drive control circuit and the switching element.

11 Claims, 7 Drawing Figures

ELECTROMAGNETIC FEEDER DRIVE CONTROL APPARATUS

BACKGROUND OF THE INVENTION

This invention relates to a drive control apparatus of an electromagnetic feeder used in a combinatorial weighing system or the like. More particularly, the invention relates to an electromagnetic feeder drive control apparatus for controlling the amplitude of oscillation of an electromagnetic feeder in precise and correct fashion, and which is adapted to electrically isolate power supply circuitry and a signal processing circuit through use of a photocoupler in order to effect amplitude control stably by means of digital control.

A combinatorial weighing system in practical use operates by supplying a plurality of weighing machines with small quantities of articles to be weighed, weighing the articles supplied to each machine, applying a signal indicative of the weight of the articles in each weighing machine to a computation control unit constituted by a microcomputer, having the computation control unit perform a combinatorial computation based on a predetermined pattern, selecting a combination, which satisfies prescribed conditions, as a discharge combination, and discharging the articles from the weighing machines corresponding to the selected combination. An electromagnetic feeder is used to supply each weighing machine with the articles to be weighed.

Figure 1:
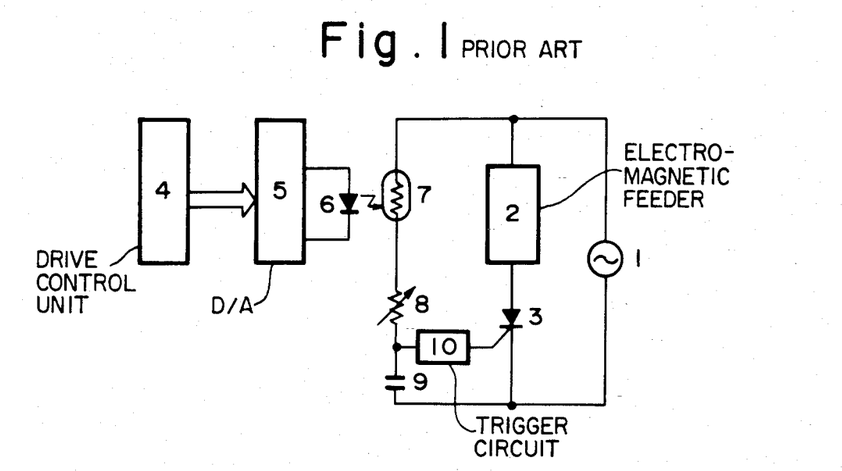
FIG. 1 is a circuit block diagram of an electromagnetic feeder drive control apparatus according to the prior art.

An example of a conventional drive control apparatus for an electromagnetic feeder of this kind is as illustrated in FIG. 1. The electromagnetic feeder, designated at numeral 2, is connected to an AC power supply 1 through a thyristor (SCR) 3. The oscillation amplitude of the electromagnetic feeder 2 is controlled in the following manner. Specifically, a digital signal is produced as an output by a drive control circuit 4 incorporated within an electronic computation control unit constituted by a microcomputer. The trigger pulse commanding signal is converted into an analog signal by a D/A converter circuit 5. The analog signal causes a light-emitting diode 6 to emit light, which irradiates a light-receiving element 7. The latter converts the light signal into an electrical signal which is applied to a CR time constant circuit comprising a variable resistor 8 and a capacitor 9. When the capacitor 9 is charged to a voltage in excess of a prescribed value, a trigger circuit 10 is actuated and the capacitor 9 is discharged, thereby applying a trigger pulse to the gate of the SCR 3 to drive the SCR 3 into conduction.

More specifically, the conventional drive control apparatus for the electromagnetic feeder 2 controls the amplitude of a current applied to the electromagnetic feeder 2 by applying a trigger pulse to the gate electrode of the SCR 3 upon expiration of a time period determined by the time constant of the CR time constant circuit, the time period beginning at the instant the power supply voltage crosses zero.

Thus, in conventional control of an electromagnetic feeder, the SCR trigger pulse commanding signal from the drive control circuit 4 is applied to the gate electrode of the SCR 3 through the CR time constant circuit. Therefore, phase control cannot be carried out while the CR time constant circuit is being charged. In addition, due to variance in the characteristics of the CR elemenrs, there are cases where correct phase control of the trigger pulse cannot be performed. Another disadvantage is a complex circuit construction.

SUMMARY OF THE INVENTION

An object of the present invention is to provide a drive control apparatus capable of controlling an electromagnetic feeder accurately without using the above-described CR time constant circuit, thereby avoiding the foregoing disadvantages of the conventional electromagnetic feeder drive control apparatus which relies upon the CR time constant circuit.

Another object of the present invention is to provide an electromagnetic feeder drive control apparatus for electrically isolating a load and power system, from a signal processing system to prevent a computation control unit from being affected by noise or the like from the power system, and for performing amplitude control by a digital control method.

According to the present invention, the foregoing objects are attained by providing an electromagnetic feeder drive control apparatus having a thyristor connected to an AC power supply and in series with an electromagnetic feeder, with the amplitude of oscillation of the feeder being regulated by controlling the conduction phase angle of the thyristor by a trigger pulse commanding signal from a drive control circuit. The apparatus comprises a sensor connected to the AC power supply for producing a detection signal upon sensing that the power supply voltage has crossed a value of zero, a photocoupler for supplying the drive control circuit with the detection signal of the sensor, and an SCR drive circuit including a photocoupler for supplying the gate of the thyristor with a trigger pulse based on the trigger pulse commanding signal produced by the drive control circuit in response to the detection signal.

Since the electromagnetic feeder drive control apparatus of the present invention eliminates the conventionally employed CR time constant circuit, a variance in the characteristics of the CR elements no longer leads to a decline in the firing control precision of the voltage supplied to the electromagnetic feeder. The feeder may therefore be controlled accurately and correctly and the circuitry of the control apparatus simplified. In addition, since the drive control circuit serving as the signal processing system is isolated from the power supply side by a photocoupler or a photo thyristor coupler, the drive control circuit is free from the influence of, e.g., noise from the power supply side. The electromagnetic feeder can be subjected to amplitude control digitally and in stable fashion. Furthermore, according to the present invention, a number of electromagnetic feeders can be controlled by a single zero-cross sensor and a single drive control circuit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
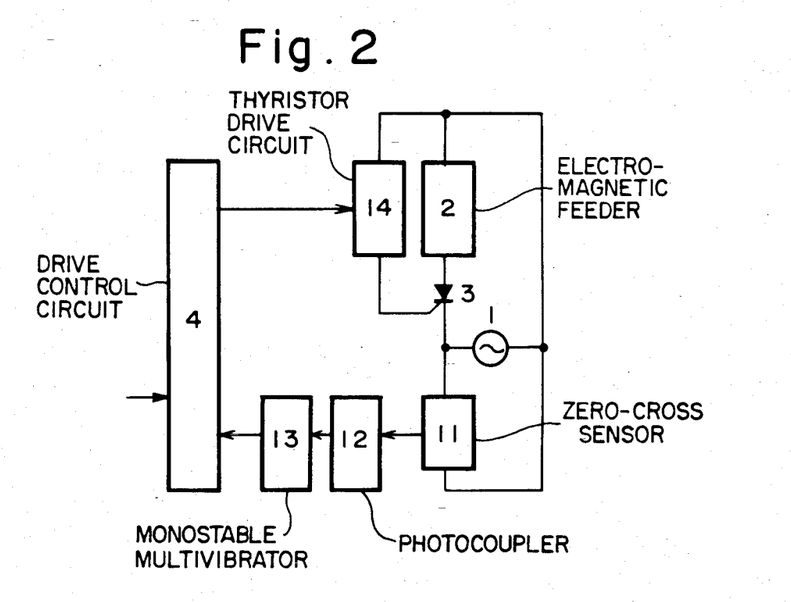
FIG. 2 is a circuit block diagram of an embodiment of an electromagnetic feeder drive control apparatus in accordance with the present invention.

With reference to the block diagram of FIG. 2 illustrating an embodiment of the present invention, the electromagnetic feeder 2, which finds use in a combinatorial weighing apparatus or the like, is connected in series with the thyristor (SCR) 3 and is further connected to the AC power supply 1. A zero-cross sensor 11 is connected to the AC power supply 1 for sensing the zero-cross point of the power supply voltage and for producing an output signal indicative of the fact that the zero point has been crossed. This output signal is applied to a photocoupler 12 for delivery to a monostable multivibrator 13 which serves as a waveshaping circuit. In delivering the signal to the monostable multivibrator 13, the photocoupler 12 electrically isolates the power supply side from the signal processing side. The zero-cross point signal, upon being wave-shaped by the monostable multivibrator 13, is supplied as an interrupt signal to the drive control circuit 4 comprising a microcomputer. It should be noted that if the zero-cross point output signal from the photocoupler 12 is clearly rectangular in shape, the monostable multivibrator 13 used for waveshaping purposes may be deleted and the output of the photocoupler 12 applied directly to the drive control circuit 4 as the interrupt signal.

Figure 3:
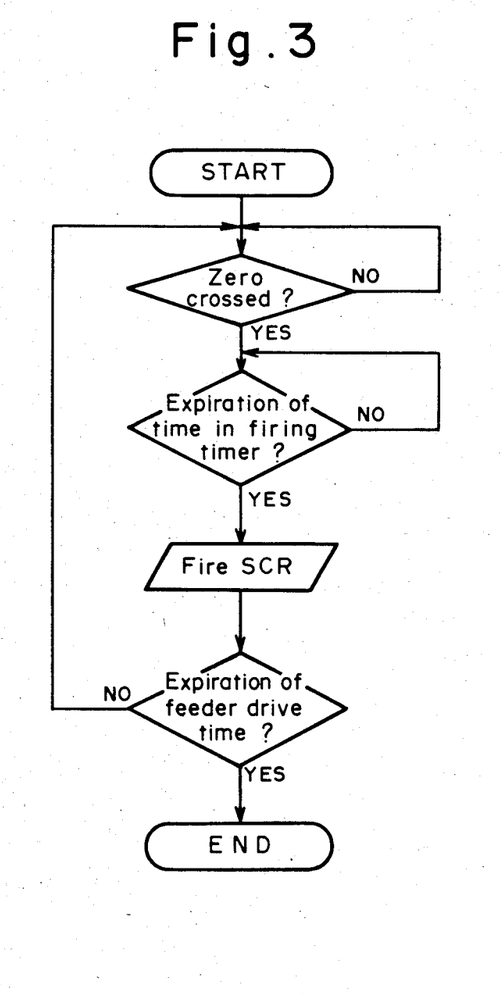
FIG. 3 is a program flow chart useful in describing the operation of the present invention.

The drive control circuit 4 thus supplied with the signal indicating that the power supply voltage has crossed the zero point, proceeds to process the signal and produce the trigger pulse commanding signal for controlling the SCR 3. More specifically, as illustrated by the flowchart shown in FIG. 3, the drive control circuit 4 determines whether the zero-cross point signal has been supplied as an interrupt signal. If the result of the decision is affirmative, then a firing timer (software timer) which has been preset, is rendered operational to produce a trigger pulse commanding signal for the SCR 3 upon expiration of a prescribed period of time which starts being counted the instant the power supply voltage crosses the zero point. The trigger pulse commanding signal is produced every cycle of the AC power supply/until expiration of a preset electromagnetic feeder drive time.

The trigger pulse commanding signal from the drive control circuit 4 is applied to the gate electrode of the SCR 3 through a thyristor drive circuit 14 which comprises a thyristor and a LED. The drive circuit 14 responds by driving the SCR 3 into conduction to drive and control the electromagnetic feeder 2. When the AC power supply/reverses, the SCR 3 is turned off. Thus, on/off control of the electromagnetic feeder 2 is repeated in accordance with the cycle of the AC power supply.

Figure 4:
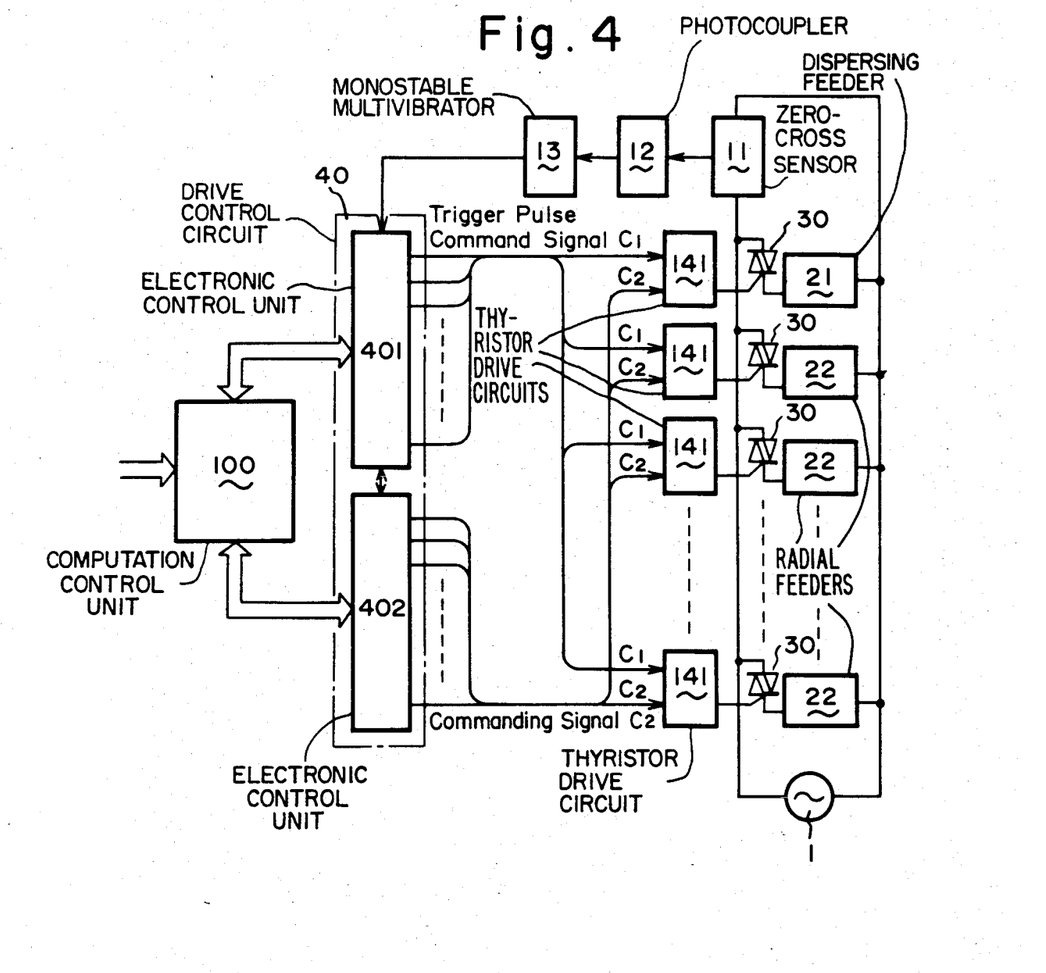
FIG. 4 is a circuit block diagram of another embodiment of an electromagnetic feeder drive control apparatus according to the present invention.
Figure 5:
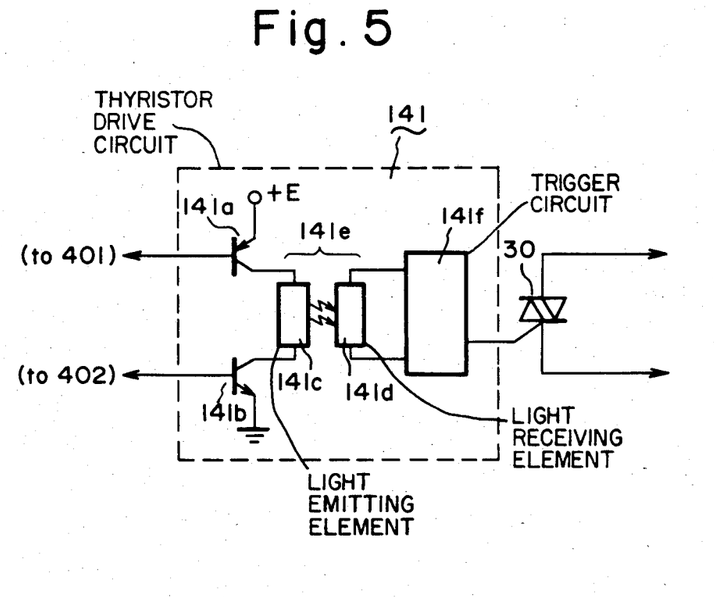
FIG. 5 is a circuit diagram of a thyristor drive circuit employed in the electromagnetic feeder drive control apparatus shown in FIG. 4.
Figure 6:
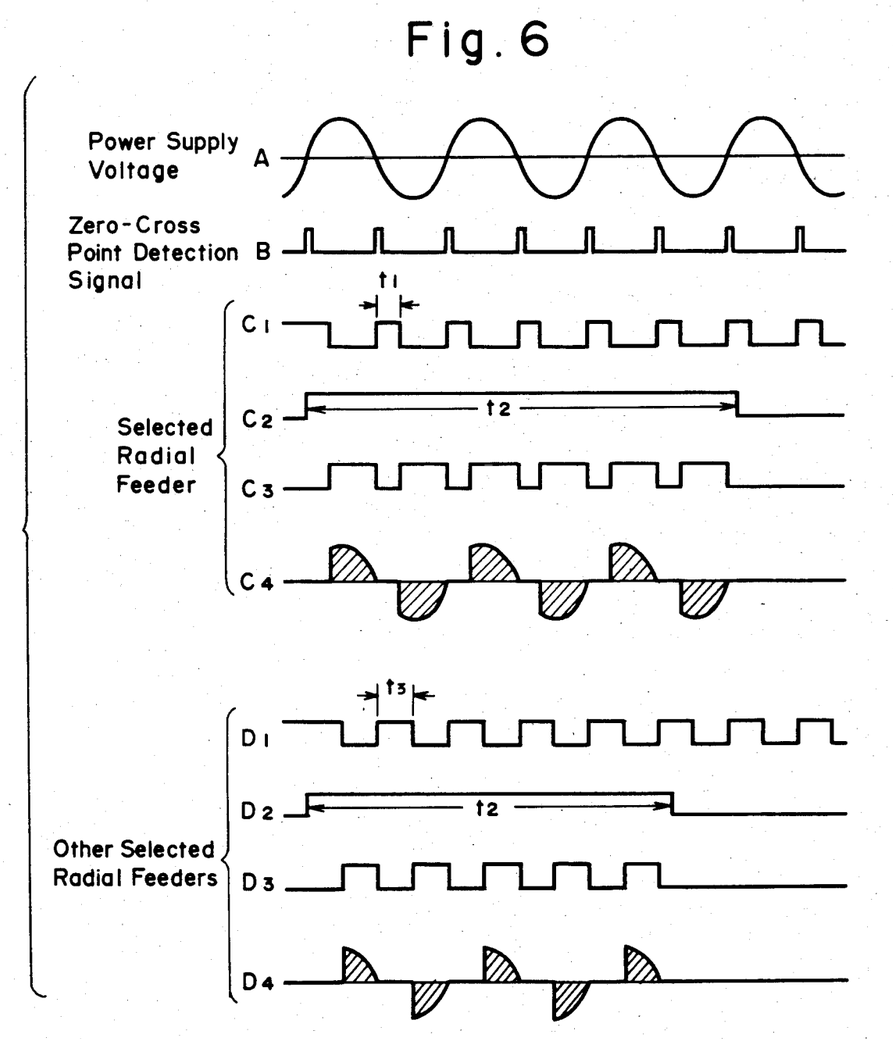
FIGS. 6 and 7 are time charts for describing the operation of the apparatus shown in FIG. 4.

Reference will now be had to FIGS. 4 through 6 to describe an example in which the electromagnetic feeder drive control apparatus of the present invention is applied to a drive control apparatus for a dispersing feeder and radial feeders for supplying articles in a combinatorial weighing apparatus. In the example described, a triac is used to control the on/off action of a power supply for the dispersing feeder and radial feeders.

With reference to FIG. 4, numeral 21 denotes a dispersing feeder disposed at the center of a combinatorial weighing apparatus and supplied with articles by a supply conveyor (not shown). Radial feeders 22 . . . 22 are disposed to surround the dispersing feeder, receive the articles supplied by the dispersing feeder 21 and feed the articles to pool hoppers (not shown). The dispersing feeder 21 and the radial feeders 22 are connected to the power supply 1. Articles fed to the pool hoppers are thenceforth supplied to weighing machines (not shown).

The zero-cross sensor 11 is connected to the AC power supply 1 and applies its output signal, which is indicative of the fact that the power supply voltage has crossed zero, as an interrupt signal to a drive control circuit 40 through the photocoupler 12 and monostable multivibrator 13. The drive control circuit 40, which is operable to produce commanding signals for driving SCRs, described below, on the basis of the zero-cross detection signal produced by the sensor 11, comprises an electronic control unit 401 for controlling feeder amplitude, and an electronic control unit 402 for controlling feeder operating time. The electronic control unit 401 controls the phase of the AC voltage impressed upon the dispersing feeder 21 and radial feeders 22, and the electronic control unit 402 controls the duration of oscillation of the dispersing feeder 21 and radial feeders 22. The electronic control units 401, 402 are both of microcomputer construction.

A computation control unit 100 for controlling the drive control circuit 40 is constituted by a microcomputer. A separate computation control unit, which is not shown, is also of microcomputer construction and receives, as inputs thereto, signals from the aforementioned weighing machines indicative of the weights of the articles supplied. This computation control unit performs a combinatorial computation based on a predetermined pattern to obtain an optimum combination pattern. The optimum combination pattern, data relating to the amplitude of dispersing or radial feeders and data relating to the operating duration of the feeders, are applied as an input to the computation control unit 100. Data relating to the amplitude of the dispersing feeder 21 and of those radial feeders 22 selected by the optimum combination, are supplied by the computation control unit 100 to the electronic control unit 401 for feeder amplitude control. The computation control unit 100 provides the electronic control unit 402 for feeder operating time control with data relating to the operating time of the dispersing feeder 21 and of those radial feeders 22 selected by the optimum combination, and with a start/stop command.

Thyristor drive circuits 141 . . . 141, each of which includes a photocoupler, are provided for driving and controlling the dispersing feeder 21 and the radial feeders 22 . . . 22 in response to commanding signals produced by the electronic control units 401, 402 on the basis of the zero-cross point detection signal. The thyristor drive circuits 141 are identical in construction. As shown in FIG. 5, each thyristor drive circuit 141 comprises a switching element 141a which is turned on, i.e., closed, when a base input received from the electronic control unit 401 for feeder amplitude control attains an "L" logic level, a switching element 141b which is turned on, i.e., closed, when a base input received from the electronic control unit 402 for feeder operating time control attains an "H" logic level, a photocoupler 141e consisting of a light-emitting element 141c and a light-receiving element 141d, and a trigger circuit 141f. A trigger pulse produced as an output by the trigger circuit 141f is applied to the gate electrode of a triac 30 connected to the corresponding dispersing feeder 21 or radial feeder 22.

The operation of the electromagnetic feeder drive control apparatus having the above-described construction will now be described with reference to the time chart of FIG. 6.

When the zero-cross point sensor 11 produces a zero-cross point detection signal B with regard to a power supply voltage A, the electronic control unit 401 for feeder amplitude control delivers a commanding signal $C_1$ to the thyristor drive circuit 141 of a specific radial feeder 22 selected by an optimum combination. The pulse width $t_1$ of the commanding signal $C_1$ measured from the instant zero is crossed, is determined based on the quantity of articles supplied by the feeder during a single cycle of oscillation thereof. The oscillatory operation of the radial feeder 22 is repeated in response to the trigger pulse commanding signal. In cases where the quantity of articles supplied by the dispersing feeder 21 to the weighing hoppers via each of the radial feeders 22 during a single cycle of oscillation begins to show a tendency toward ever larger values with respect to a reference quantity, the pulse width $t_1$ is increased slightly to delay the time at which oscillation of the dispersing feeder 21 and of the required radial feeders 22 begins (i.e., to reduce the amount of feeder oscillation), thereby reducing the amount of articles supplied to the weighing machines. The manner in which this operation is performed will be described below. Conversely, if the quantity of articles supplied by the dispersing feeder 21 to the weighing hoppers, via each of the radial feeders 22, during a single cycle of oscillation begins to show a tendency toward smaller values with respect to the reference quantity, the pulse width $t_1$ is decreased slightly to advance the time at which oscillation of the dispersing feeder 21 and of the required radial feeders 22 begins (i.e., to increase the amount of feeder oscillation), thereby increasing the amount of articles supplied to the weighing machines.

The electronic control unit 402 for feeder operating time control delivers a commanding signal $C_2$ to the thyristor drive circuit 141. The pulse width $t_2$ of the commanding signal $C_2$ is measured from the instant zero is crossed and is determined based on the mean weight of the articles introduced into the weighing machines. The oscillatory operation of the radial feeder 22 is repeated in response to the trigger pulse commanding signal. In cases where the quantity of articles supplied by the dispersing feeder 21 to the weighing hoppers via each of the radial feeders 22 begins to show a tendency toward ever larger values with respect to a reference quantity, the pulse width $t_2$ is decreased slightly to shorten the duration of oscillation of the dispersing feeder 21 and of the required radial feeders 22, thereby reducing the amount of articles supplied to the weighing machines. The manner in which this operation is performed will be described below. Conversely, if the quantity of articles supplied by the dispersing feeder 21 to the weighing hoppers via each of the radial feeders 22 begins to show a tendency toward smaller values with respect to the reference quantity, the pulse width $t_2$ is increased slightly to lengthen the duration of oscillation of the dispersing feeder 21 and of the required radial feeders 22, thereby increasing the amount of articles supplied to the weighing machines.

The thyristor drive circuit 141 produces a trigger signal $C_3$ on the basis of the commanding signals $C_1$, $C_2$ and applies the trigger signal $C_3$ to the triac 30. In response to the trigger signal $C_3$, a voltage indicated at $C_4$ in FIG. 6, is applied to a specific radial feeder 22 selected by the optimum combination. For those thyristor drive circuits 141 corresponding to the other radial feeders 22 selected by the optimum combination, the electronic control unit 401 for feeder amplitude control delivers a commanding signal $D_1$. The pulse width $t_3$ of the commanding signal $D_1$ is measured from the zero-cross point and is determined based on the quantity of articles supplied during one period of oscillation, as described above. The electronic control unit 402 for feeder operating time control delivers a commanding signal $D_2$ to the thyristor drive circuit 141. On the basis of the command signals $D_1$, $D_2$, the thyristor drive circuit 141 produces a trigger signal $D_3$ and applies the trigger signal $D_3$ to the triac 30. In response to the signal $D_3$, a voltage indicated at $D_4$ in FIG. 6 is impressed upon the other radial feeders 22 selected by the optimum combination. It should be noted that since the amplitude of oscillation and the operating duration of an actuated radial feeder 22 will differ from one radial feeder to another, the applied voltage is controlled feeder by feeder.

Figure 7:
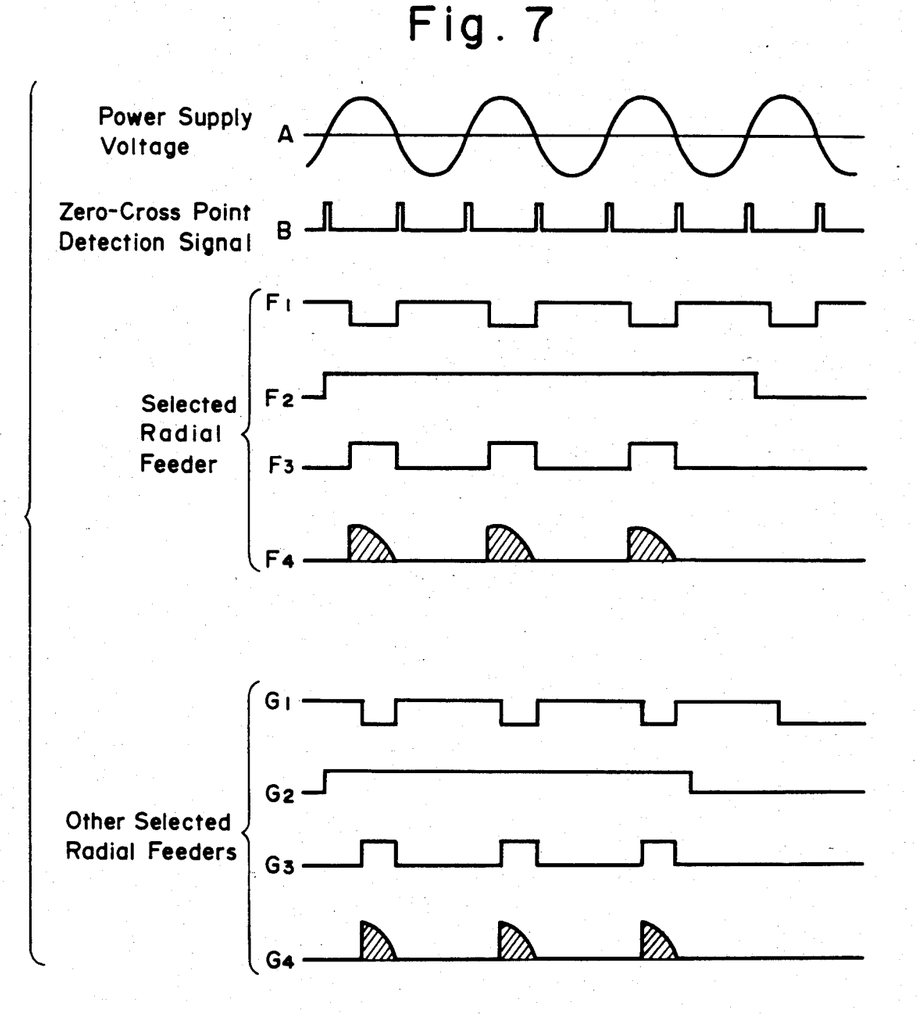

Let us now refer to FIG. 7 to describe a case in which a half-wave voltage is applied to the dispersing feeder 21 and to each of the radial feeders 22 by replacing the triac 30 of FIG. 5 with the thyristor 3 of FIG. 2 or by demultiplying the signal detected on the zero-cross point to half.

Based on the zero-cross point detection signal B with respect to the power supply voltage A, the electronic control units 401, 402 apply commanding signals $F_1$, $F_2$, respectively, to a specific radial feeder 22 selected by an optimum combination. The corresponding thyristor drive circuit 141 produces a trigger signal $F_3$ on the basis of the command signals $F_1$, $F_2$. In response to the trigger signal $F_3$, a voltage shown at $F_4$ in FIG. 7, is impressed upon the specific radial feeder 22 selected by the optimum combination. The electronic control units 401, 402 deliver respective commanding signals $G_1$, $G_2$ to the other radial feeders 22 selected by the optimum combination. The corresponding thyristor drive circuits 141 each produce a trigger signal $G_3$ based on the command signals $G_1$, $G_2$. In response, a voltage indicated at $G_4$ in FIG. 7, is impressed upon the other radial feeders 22 selected by the optimum combination.

In the foregoing embodiments, a thyristor or triac is employed as the switching element controlling the oscillation of each feeder. It goes without saying, however, that operation will proceed in a similar manner by using a switching transistor element in place of the thyristor or triac. It is possible that the thyristor drive circuit 141 comprises a photo thyristor coupler having a photo thyristor and a LED. It is also possible that the amplitude and the operation duration of the dispersing feeder 21 and the radial feeder 22 are controlled by a single microcomputer. In this case, the thyristor drive circuit shown in FIG. 4 comprises the photo thyristor coupler, and each photo thyristor coupler is controlled by the drive control circuit 4 shown in FIG. 2.

As many apparently widely different embodiments of the present invention can be made without departing from the spirit and scope thereof, it is to be understood that the invention is not limited to the specific embodiments thereof except as defined in the appended claims.

What we claim is:

1. An electromagnetic feeder drive control apparatus for regulating the amplitude of an electromagnetic feed which is driven by an AC power supply, comprising:
   an electromagnetic feeder connected to the AC power supply;
   a switching element connected to the AC power supply and connected in series with said electromagnetic feeder;
   a sensor, connected to the AC power supply, for producing a detection signal upon sensing that the voltage of the AC power supply has crossed a voltage of zero;
   a drive control circuit coupled to said sensor, said drive control circuit comprising a microcomputer for producing a timing signal which sets on/off timing for said switching element based on the detection signal;
   a first photocoupler, connected to said sensor, for transmitting the detection signal from said sensor;
   a waveshaping circuit, connected to said first photocoupler and said drive control circuit, for receiving the detection signal and for providing a waveshaped detection signal to said drive control circuit; and
   a thyristor drive circuit connected to said drive control circuit and said switching element, said thyristor control circuit having a second photocoupler at an input section thereof for receiving the timing signal, for producing a trigger pulse based on the timing signal, and for applying the trigger pulse to said switching element.

2. A drive control apparatus according to claim 1, wherein said drive control circuit comprises:
   a first electronic control unit, connected to said waveshaping circuit and said thyristor drive circuit, for generating a portion of the timing signal for controlling the amplitude of said electromagnetic feeder; and
   a second electronic control unit, connected to said waveshaping circuit and said thyristor drive circuit, for generating a portion of the timing signal for controlling operating duration of said electromagnetic feeder.

3. A drive control apparatus according to claim 1, wherein said first and second electronic control units produce first and second control signals, respectively, and wherein said thyristor drive circuit comprises:
   first switching means, connected between said first electronic control unit and said second photocoupler and provided at the input section, for receiving the first control signal produced by said first electronic control unit; and
   second switching means, connected between said second electronic control unit and said second photocoupler and provided at the input section, for receiving the second control signal produced by said second electronic control unit.

4. A drive control apparatus according to claim 1, wherein said second photocoupler of said thyristor drive circuit comprises a LED connected to said drive control circuit and a photo thyristor connected to said switching element.

5. A drive control apparatus according to claim 1, wherein said switching element comprises a thyristor.

6. A drive control apparatus according to claim 1, wherein said switching element comprises a triac.

7. A drive control apparatus according to claim 1, wherein said switching element comprises a transistor element.

8. An article feeder drive control apparatus for regulating the rate at which articles are fed by a feeder which is driven by an AC power supply, comprising:
   a switching element connected to the AC power supply and connected in series with the feeder;
   a sensor, connected to the AC power supply, for producing a detection signal when it is sensed that the voltage of the AC power supply has crossed a reference voltage;
   a drive control circuit, coupled to said sensor, for generating a timing signal corresponding to on/off timing for said switching element, based on the detection signal generated by said sensor;
   a first photocoupler, connected to said sensor, for transmitting the detection signal;
   a waveshaping circuit, connected between said first photocoupler and said drive control circuit, for receiving the detection signal and for providing a waveshaped detection signal to said drive control means; and
   a switch drive circuit, connected to said drive control circuit and said switching element, for generating a trigger pulse based on the timing signal, and for applying the trigger pulse to said switching element to cause the feeder to be driven by the AC power supply, said switch drive circuit including:
   a second photocoupler, connected to said drive control circuit, for transmitting the timing signal from said drive control circuit; and
   a trigger circuit, connected to said second photocoupler and said switching element, for receiving the timing signal from said second photocoupler and for generating the trigger pulse.

9. A drive control apparatus according to claim 15, wherein said switching element comprises a thyristor.

10. A drive control apparatus according to claim 15, wherein said switching element comprises a triac.

11. A drive control apparatus according to claim 15, wherein said switching element comprises a transistor.

* * * * *

UNITED STATES PATENT AND TRADEMARK OFFICE
CERTIFICATE OF CORRECTION

PATENT NO. : 4,626,956

DATED : DECEMBER 2, 1986

INVENTOR(S) : KAZUFUMI NAITO

It is certified that error appears in the above-identified patent and that said Letters Patent is hereby corrected as shown below:

Col. 3, line 53, "supply/until" should be --supply 1 until--;

line 61, "supply/reverses," should be --supply 1 reverses,--.

Col. 7, line 8, "feed" should be --feeder--.

Signed and Sealed this

Thirty-first Day of March, 1987

Attest:

DONALD J. QUIGG

Attesting Officer

Commissioner of Patents and Trademarks